United States Patent
Iguchi et al.

(10) Patent No.: US 8,921,248 B2
(45) Date of Patent: Dec. 30, 2014

(54) DIELECTRIC CERAMIC COMPOSITION AND ELECTRONIC DEVICE

(71) Applicant: TDK Corporation, Chuo-ku (JP)

(72) Inventors: Toshihiro Iguchi, Chuo-ku (JP); Akitoshi Yoshii, Chuo-ku (JP); Tatsuya Kojima, Chuo-ku (JP); Satoshi Takagi, Chuo-ku (JP)

(73) Assignee: TDK Corporation, Tokyo (JP)

(*) Notice: Subject to any disclaimer, the term of this patent is extended or adjusted under 35 U.S.C. 154(b) by 6 days.

(21) Appl. No.: 13/773,380

(22) Filed: Feb. 21, 2013

(65) Prior Publication Data

US 2013/0222970 A1   Aug. 29, 2013

(30) Foreign Application Priority Data

Feb. 29, 2012 (JP) ................. 2012-044012

(51) Int. Cl.

| | |
|---|---|
| *H01G 4/10* | (2006.01) |
| *C04B 35/495* | (2006.01) |
| *C04B 35/50* | (2006.01) |
| *H01G 4/12* | (2006.01) |
| *H01G 4/30* | (2006.01) |
| *C01G 33/00* | (2006.01) |
| *C01G 35/00* | (2006.01) |

(52) U.S. Cl.
CPC ............. *C04B 35/50* (2013.01); *H01G 4/1209* (2013.01); *C04B 35/495* (2013.01);
(Continued)

(58) Field of Classification Search
CPC ................. C04B 35/495; C04B 35/50; C04B 2235/3224; C04B 2235/3225; C04B 2235/3227; C04B 2235/3229; C04B 2235/3251; C04B 2235/76
USPC ................................. 501/135, 152; 361/321.4
See application file for complete search history.

(56) References Cited

U.S. PATENT DOCUMENTS 5,762,816 A    6/1998 Kimura et al.
7,674,738 B2 * 3/2010 Kubota ..................... 501/135
(Continued)

FOREIGN PATENT DOCUMENTS

CN    1156131 A    8/1997
JP    2004-342487 A  12/2004

OTHER PUBLICATIONS

Masuno, K., "X-Ray and Dielectric Studies of the Systems (Ba1-xR2x/3)Nb2O6, Where R is Y, Sm or La," Journal of the Physical Society of Japan, 1964, vol. 19, No. 3, pp. 323-328.

(Continued)

*Primary Examiner* — Karl Group
(74) *Attorney, Agent, or Firm* — Arent Fox LLP

(57) ABSTRACT

Dielectric ceramic composition comprising a compound shown by a general formula $\{A_{1-x}(RE)_{2x/3}\}_y\text{-}B_2O_{5+y}$ and has a tungsten bronze-type structure. In the formula, "A" is at least one selected from a group comprising Ba, Ca, Sr and Mg, "B" is at least one selected from Nb and Ta, "RE" is at least one selected from Sc, Y, La, Ce, Pr, Nd, Sm, Eu, Gd, Tb, Dy, Ho, Er, Tm, Yb and Lu, and said "x" and "y" satisfies $0<x<1$ and $y<1.000$, respectively. The dielectric ceramic composition further comprises an oxide of at least one selected from V, Mo, Fe, W, Mn and Cr.

4 Claims, 1 Drawing Sheet

(52) U.S. Cl.
CPC .............. *H01G 4/30* (2013.01); *H01G 4/1254* (2013.01); *C01G 33/006* (2013.01); *C01G 35/006* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3227* (2013.01); *C04B 2235/3229* (2013.01); *C04B 2235/3239* (2013.01); *C04B 2235/3241* (2013.01); *C04B 2235/3251* (2013.01); *C04B 2235/3256* (2013.01); *C04B 2235/3258* (2013.01); *C04B 2235/3262* (2013.01); *C04B 2235/3272* (2013.01); *C04B 2235/652* (2013.01); *C04B 2235/656* (2013.01); *C04B 2235/6562* (2013.01); *C04B 2235/6582* (2013.01); *C04B 2235/6588* (2013.01); *C04B 2235/663* (2013.01); *C04B 2235/76* (2013.01); *C04B 2235/9615* (2013.01); *C01P 2006/40* (2013.01)
USPC .......................... 501/135; 501/152; 361/321.4

(56) References Cited

U.S. PATENT DOCUMENTS 7,727,921 B2 * 6/2010 Takeda ........................ 501/135
7,742,278 B2 * 6/2010 Takeda ...................... 361/321.2

OTHER PUBLICATIONS

Sakamoto et al., "Chemical Solution Processing and Characterization of Highly Oriented (Ba,Ln)Nb2O6 [Ln: La, Gd, Dy] Thin Films," Jpn, J. Appl. Phys., 2002, vol. 41, Part 1, No. 11B, pp. 6647-6652.

Sakamoto et al., "Chemical Solution Processing and Properties of Tungsten Bronze (Ba,La)Nb2O6 Thin Films," Integrated Ferroelectrics, 2001, vol. 36, pp. 191-200.

Wakiya et al., "Synthesis and Dielectric Properties of Ba1-xR2x/3Nb2O6 (R: Rare Earth) with Tetragonal Tungsten Bronze Structure," Journal of the European Ceramic Society, 1999, vol. 19, pp. 1071-1075.

Chinese Office Action issued Apr. 9, 2014; Chinese Application No. 201310064017.9, with English Translation.

* cited by examiner

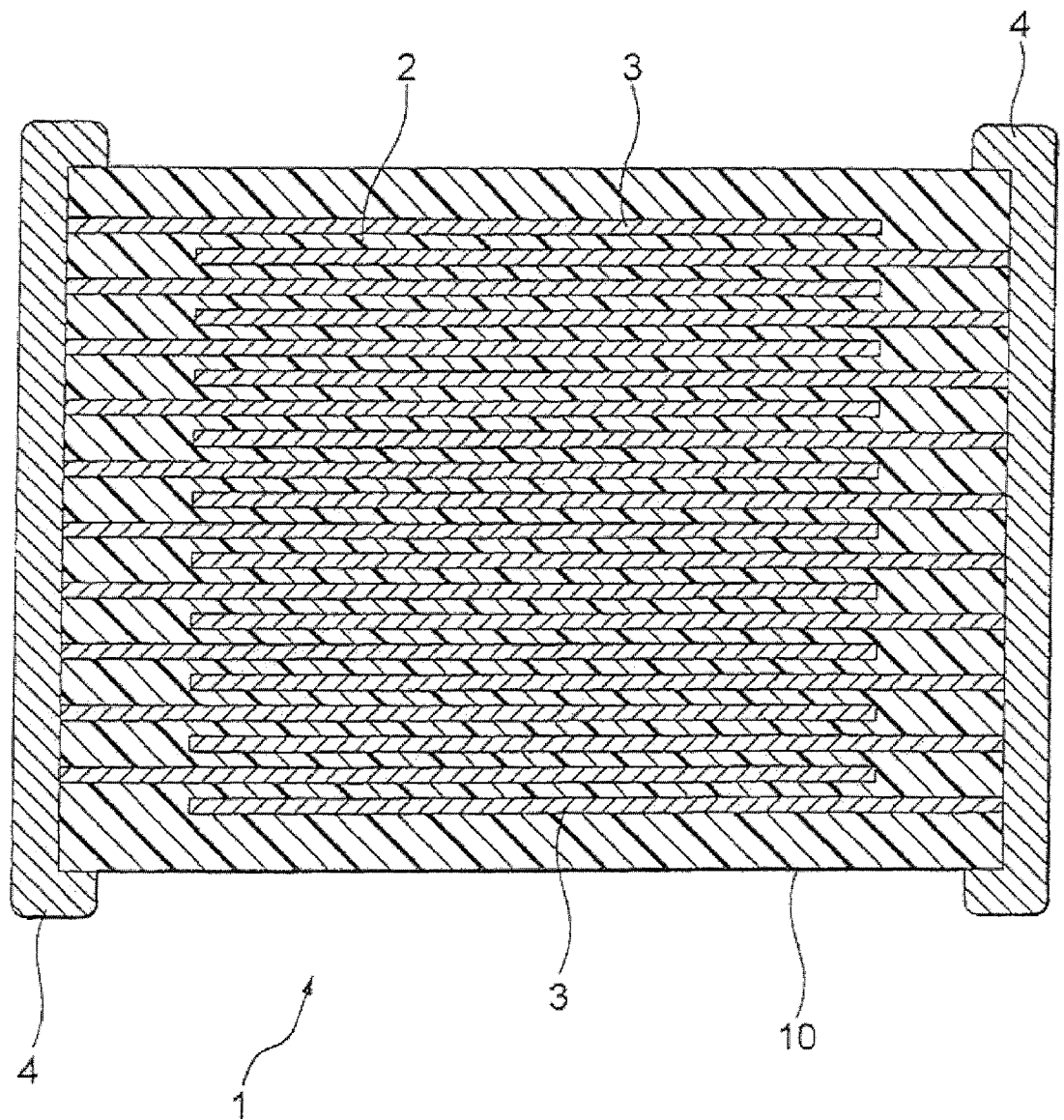

DIELECTRIC CERAMIC COMPOSITION AND ELECTRONIC DEVICE

BACKGROUND OF THE INVENTION

1. Field of the Invention

The present invention relates to a dielectric ceramic composition and electronic device wherein said dielectric ceramic composition is applied to its dielectric layer. More precisely, the present invention relates to a dielectric ceramic composition having good characteristics under a high electric field intensity, and to an electronic device wherein said dielectric ceramic composition is applied to dielectric layer and its internal electrode is mainly composed of a base metal.

2. Description of the Related Art

In recent years, a demand for a high reliability of electronic device is high. For instance, size reduction and high performance of multilayer ceramic capacitor, an example of electronic device, is rapidly processing; while its use is expanding. As a result, various characteristics are required for such capacitors.

Conventionally, ceramic composition showing ferroelectricity (ferroelectrics), such as barium titanate, is often used for dielectric layer of electronic device, such as capacitor.

However, when electronic device having dielectric layer of ferroelectrics is used under a high rated voltage, namely, when it is used under a high field intensity, various problems due to ferroelectricity of the ceramic composition were caused.

For instance, there was a problem that specific permittivity rapidly decreases as field intensity increases; and as a result, effective capacitance under used environment decreases. In addition, there were problems that capacitance of capacitor decreases as specific permittivity of dielectrics decreases, which leads to deterioration of DC-Bias characteristic, and cracks or noises due to electrostriction generate. There was also a problem such as a deterioration of capacitance change rate with respect to temperature.

Therefore, dielectric ceramic composition having good characteristics (such as specific permittivity) is required, even when field intensity is high (e.g. superimposed direct current).

Further, one way to manufacture electronic device at a low cost is to use base metal as electrode material. In particular, when base metal is used for material of internal electrode of multilayer electronic device, dielectric layer and internal electrode are required to be cofired under a reduced atmosphere. Thus, ceramic composition, composing dielectric layer cofired with the base metal, is required to show resistance to reduction.

The below descried Article 1 describes a compound wherein rare-earth element is solid solved in $BaNb_2O_6$ having tungsten bronze-type structure.

[Article 1] Kunio Masuno, "X-Ray and Dielectric Studies of the Systems $(Ba_{1-x}R_{2x/3})Nb_2O_6$, Where R is Y, Sm or La", Journal of the Physical Society of Japan, 1964, Vol. 19, No. 3, p. 323-328

SUMMARY OF THE INVENTION

The present invention has been made by considering the above circumstances, and a purpose of the present invention is to provide a dielectric ceramic composition having good characteristics under a high electric field intensity which is possible for a reduction firing, and to an electronic device wherein said dielectric ceramic composition is applied to dielectric layer and its internal electrode is mainly composed of a base metal.

In order to achieve the above purpose, dielectric ceramic composition according to the present invention comprises a compound shown by a general formula $\{A_{1-x}(RE)_{2x/3}\}_y\text{-}B_2O_{5+y}$, having tungsten bronze-type structure, wherein said A is at least one selected from Ba, Ca, Sr and Mg, said B is at least one selected from Nb and Ta, said RE is at least one selected from Sc, Y, La, Ce, Pr, Nd, Sm, Eu, Gd, Tb, Dy, Ho, Er, Tm, Yb and Lu, and said "x" and "y" satisfies 0<x<1 and y<1.000, respectively.

In the present invention, "y" in the above tungsten bronze-type structured compound showing mole ratio of "A" element and "RE" element with respect to "B" element, is less than 1.000. This will allow the above compound to show good resistance to reduction, and that reduction firing of dielectric ceramic composition of the invention is possible. As a result, even when internal electrode, mainly composed of a base metal, and the dielectric ceramic composition are cofired under a reduced atmosphere, said dielectric ceramic composition will not be reduced. Thus, electronic device of low cost and good characteristics can be obtained.

Note that the above compound shows relatively low specific permittivity when field intensity is low (e.g. when direct current is not superimposed). However, said compound is paraelectric and that there is little decline in its specific permittivity even when field intensity increases, which differs from ferroelectrics of barium titanate and the like. Therefore, under a high field intensity, dielectric ceramic composition of the invention show better characteristics (e.g. DC-Bias characteristic) than ferroelectrics.

Preferably, the composition further comprises oxide of at least one selected from V, Mo, Fe, W, Mn and Cr.

This allows further improvement in effect of the present invention.

Further, electronic device according to the present invention comprises a dielectric layer, composed of dielectric ceramic composition described any of the above, and an internal electrode mainly composed of a base metal. Although electronic device is not particularly limited, electronic device used under a high rated voltage is preferable. A multilayer ceramic capacitor is exemplified for such electronic device.

BRIEF DESCRIPTION OF THE DRAWINGS

The FIGURE is a cross-sectional view of a multilayer ceramic capacitor according to an embodiment of the present invention.

DETAILED DESCRIPTION OF THE INVENTION

Hereinafter, the present invention will be described based on embodiments shown in drawings.

(Multilayer Ceramic Capacitor 1)

As is shown in the FIGURE, multilayer ceramic capacitor 1 has a capacitor element body 10 in which dielectric layers 2 and internal electrode layers 3 are alternately stacked. On both ends of capacitor element body 10, a pair of external electrodes 4 is respectively conducted to internal electrode layers 3, alternately stacked within capacitor element body 10. Although a shape of capacitor element body 10 is not particularly limited, it is generally a rectangular parallelpiped. Further, its size is also not particularly limited and may be a suitable size according to its use.

(Dielectric Layer 2)

The dielectric layer 2 is constituted from a dielectric ceramic composition according to the present embodiment. The dielectric ceramic composition is shown by a general formula $\{A_{1-x}(RE)_{2x/3}\}_y\text{-}B_2O_{5+y}$, and comprises a compound having tungsten bronze-type structure.

Said compound is a compound wherein "A" element in $A_yB_2O_{5+y}$ compound having tungsten bronze-type structure is substituted (solid solved) for "RE" element. In the present embodiment, said compound is paraelectric. With this paraelectricity of said compound, said dielectric ceramic composition may show superior DC bias characteristic, show a small capacitance change rate with respect to temperature, and prevent crack or noise due to electrostriction.

"X" shows substituted amount of "RE" element with respect to "A" element and $0<x<1$. In the present embodiment, "x" is preferably larger than 0.20 and is more preferably 0.33 or more. By determining "x" within the above range, relatively high specific permittivity can be easily obtained while maintaining high insulation resistivity.

Further, "x" is preferably less than 0.50, and more preferably 0.43 or less. By determining "x" within the above range, relatively high specific permittivity can be easily obtained while maintaining high insulation resistivity.

"y" shows a ratio of "A" and "RE" elements with respect to "B" element, and $y<1.000$. Namely, a total mole number of "A" and "RE" elements is less than mole number of "B" element; and oxygen "O" is biased in response to the ratio. By setting $y<1.000$, dielectric ceramic composition according to the present embodiment shows good resistance to reduction. Therefore, even when reduction firing is performed on said dielectric ceramic composition, oxygen defect will be difficult to generate; and thus it can prevent to make semiconductor of the dielectric ceramic composition.

It is preferable that "y" is 0.700 or more. By setting "y" within the above range, relatively high specific permittivity can be easily obtained. Further, it is preferable that "y" is 0.998 or less. By setting "y" within the above range, it can further improve resistance to reduction of dielectric ceramic composition.

In the present embodiment, "A" element in the above general formula is at least one selected from Ba, Ca, Sr and Mg; and Ba is preferable.

Further, "B" element is at least one selected from Nb and Ta; and Nb is preferable.

"RE" element is at least one selected from Sc, Y, La, Ce, Pr, Nd, Sm, Eu, Gd, Tb, Dy, Ho, Er, Tm, Yb and Lu; and La is preferable. By including "RE" element, relatively high specific permittivity can be easily obtained while maintaining paraelectric.

In the present embodiment, said dielectric ceramic composition is preferable to comprise an oxide of at least one selected from V, Mo, Fe, W, Mn and Cr in addition to the above compound. It is preferable to comprise at least V oxide, and it is particularly preferable to comprise both V oxide and Mn oxide. By setting as above, resistance to reduction of the dielectric ceramic composition can be further improved.

Content of oxide of at least one selected from V, Mo, Fe, W, Mn and Cr, with respect to 100 moles of said compound is preferably 0.05 to 5 moles in terms of element.

Dielectric ceramic composition according to the present embodiment may further include the other composition in accordance with its desired characteristic.

In the present embodiment, crystal particle diameter of dielectric particles may be determined in accordance with thickness of dielectric layer 2 and the like. Further, thickness of dielectric layer 2 may be suitably determined according to its use and the like. Multilayered number of dielectric layer 2 may also be suitably determined according to its use and the like.

(Internal Electrode Layer 3)

Main component of conducting material included in internal electrode layer 3 is a base metal. Base metal is not particularly limited; and a well-known conducting material such as Ni, Cu, Ni alloy and Cu alloy can be used as the base metal. Thickness of internal electrode layer 3 is suitably determined according to its use and the like.

Dielectric ceramic composition according to the present embodiment shows good resistance to reduction. Thus, even when base metal is used for conducting material of internal electrode layer and cofired with dielectric ceramic composition under a reduced atmosphere, the dielectric ceramic composition will not be reduced and will not become semiconductor.

(External Electrode 4)

Conducting material included in external electrode 4 is not particularly limited, and well-known conducting materials, such as Ni, Cu, Ag, Pd, Pt, Au, and alloys thereof and conductive resin, can be used. Thickness of external electrode 4 may be suitably determined in accordance with its use and the like (Manufacturing Method of Multilayer Ceramic Capacitor 1)

Multilayer ceramic capacitor 1 according to the present embodiment may be manufactured by a well-known method. In the present embodiment, green chip is manufactured by using paste, and then by firing them, a multilayer ceramic capacitor is manufactured. Manufacturing method will be concretely described below.

Firstly, dielectric material for forming dielectric layer is prepared, and then made to a paste in order to prepare a dielectric layer paste.

In the present embodiment, raw materials of a compound shown by a general formula $\{A_{1-x}(RE)_{2x/3}\}_y\text{-}B_2O_{5+y}$ is prepared, and then made to dielectric raw materials. If needed, a raw material of oxide of at least one selected from V, Mo, Fe, W, Mn and Cr may be prepared, and then mixed with raw material of said compound, making the dielectric raw materials.

As for raw materials of the above compound or oxide; oxides, their mixtures and their composite oxides may be used. Further, variety of compounds which become the above oxides or composite oxides after firing may also be used.

For instance, as for raw material of the above compound, oxide or carbonation of "A" element, oxide or hydroxide of "RE" element and oxide of "B" element may be prepared. Preliminary fired material, obtained by weighing these oxides et al. to be a predetermined composition, mixing the composition, and preliminary firing the mixture at predetermined temperature, may be dielectric raw materials.

Dielectric layer paste is obtained by kneading raw materials of the above described conductive materials, binder and solvent. Well-known materials can be used for the binder and the solvent. Said paste may include additives such as plasticizer, if required.

Internal electrode paste is obtained by kneading the above described dielectric raw materials, binder and solvent. Well-known materials can be used for the binder and the solvent. Said paste may include additives such as inhibitor and plasticizer, if required.

External electrode paste may be prepared in the same way as the internal electrode paste is prepared.

Green sheet and internal electrode pattern are formed by using the obtained pastes, and then green chip is obtained by laminating the same.

The binder removal process is performed to the obtained green chip, if required. Binder removal process condition may be a well-known condition, and for instance, a holding temperature is preferably 180 to 400° C.

After a binder removal processing, green chip is fired and a capacitor element body as a sintered body is obtained. In the present embodiment, firing in a reduced atmosphere (reduction firing) is performed. The other firing conditions may be well-known conditions, and for instance, a holding temperature is preferably 1150 to 1350° C.

After firing, reoxidation treatment (anneal) is performed to the obtained capacitor element body, when required. Annealing condition may be a well-known condition, and for instance, oxygen partial pressure when annealing is set higher than the same when firing and the holding temperature is preferably 1100° C. or less.

End surface polishing is performed to the above obtained capacitor element body, external electrode paste is pasted and then baked, and external electrode 4 is formed. A cover layer is then formed by plating, etc. on the surface of the external electrode 4, when necessary.

A multilayer ceramic capacitor of the present embodiment produced as above is mounted on a printed substrate, etc. by such as soldering, and used for a variety of electronic apparatuses, etc.

An embodiment of the present invention is explained above, but the present invention is not limited to the above embodiment and may be variously modified within the scope of the present invention.

For instance, in the above embodiment, a multilayer ceramic capacitor is explained as an example of ceramic electronic device according to the present invention, but ceramic electronic device according to the present invention is not limited to the multilayer ceramic capacitor and may be any as far as it includes the above constitution.

EXAMPLE

Below, the present invention will be explained based on furthermore detailed examples, but the present invention is not limited to the examples.

Example 1

At first, a compound powder shown by a general formula $\{A_{1-x}(RE)_{2x/3}\}_y\text{-}B_2O_{5+y}$ was prepared, and this was determined as dielectric raw materials. In the general formula, "A" element is Ba, "RE" element is La, "B" element is Nb, "x" is 0.40 and "y" is the values shown in Table 1.

Next, ion-exchange water and polyvinyl alcohol were poured in a container, mixed for 2 hours at 85° C., and then polyvinyl alcohol aqueous solution was obtained. Concentration of the aqueous solution was made to 6 wt % by regulating an amount of ion-exchange water.

20 wt % of polyvinyl alcohol aqueous solution with respect to 100 wt % of the prepared dielectric raw materials was added, mixed and granulated in a mortar, and then granulated powder was obtained. The obtained granulated powder was poured into a mold of φ 11.1 mm, press formed under a pressure of 10 kg/cm², and then a disk-shaped green compact was obtained.

Next, the obtained green compact was fired under a reduced atmosphere and a disk-shaped sintered body was obtained. Firing conditions were a temperature rising rate of 200° C./h, a holding temperature of 1150 to 1350° C., and a holding time of 2 hours. The atmospheric gas was a gas humidified to a dew point of 45° C. (hydrogen concentration of 0.06%).

Contraction ratio of the obtained sintered body was measured by methods described below. Measurements are shown in Table 1. Subsequently, In—Ga electrode of φ 6 mm was coated on both principal surfaces of the sintered body, baking treatment was performed, and then, disk-shaped ceramic capacitor sample was obtained.

Further, in example 1, capacitor sample was manufactured using a compound shown by a general formula $BaTiO_3$, for a comparison of the above samples. First, powder of the compound was prepared as dielectric raw materials. Disk-shaped ceramic capacitor sample was prepared by the same method as the above samples, except the above powder was used, holding temperature when firing was 1325° C. and firing atmosphere was not adjusted and fired in air.

Specific permittivity, insulation resistivity and DC-Bias characteristics of the obtained each capacitor sample were respectively evaluated by the methods described below. Evaluation results are shown in Table 1. Note that specific permittivity and DC-Bias characteristic of capacitor sample, using compound shown by a general formula $BaTiO_3$, were evaluated.

(Contraction Ratio)

First, diameter R of the obtained sintered body was measured. Then, contraction ratio was calculated by the following formula based on diameter RA and diameter R of mold.

$$\text{contraction ratio}(\%) = 100 \times (RA - R)/RA$$

A large contraction ratio indicates a high density of sintered body. In the present examples, contraction ratio of 15% or more is determined good, 16% or more is determined preferable, and 17% or more is determined more preferable. Results are shown in Table 1.

(Specific Permittivity)

Capacitance C of a capacitor sample was measured under frequency of 1 kHz and measured voltage of 1 Vrms at reference temperature of 25° C. using 4284A by HP Co. Then, specific permittivity was calculated by thickness of a sintered body, effective electrode area, and capacitance C, which was obtained from the measurement. In the present examples, a high specific permittivity is preferable and 100 or more is more preferable. Results are shown in Table 1.

(Insulation Resistivity)

Insulation resistance of capacitor sample was measured by using 4339B HIGH RESISTANCE METER by HP Co. and 16339A COMPONENT TEST FIXTURE by HP Co., and then insulation resistivity was calculated. Measured conditions were applied voltage of 50 V and applied time of 30 sec. High insulation resistivity is difficult to be reduced, and that it becomes possible to cofire with internal electrode, mainly composed of a base metal, under a reduced atmosphere. In the present example, insulation resistivity of $1.0 \times 10^5$ (Ω·m) or more is determined good. Results are shown in Table 1.

(DC-Bias Characteristic)

First, samples for measuring DC bias characteristic were manufactured. Binder resin and solvent were mixed to the above prepared dielectric raw materials to make paste. Green sheet was formed by using the obtained paste, Ni electrode was printed thereon, binder removal process, reduction firing and reoxidation treatment were performed, and then a multilayer ceramic capacitor sample was manufactured. Distance between Ni electrodes (thickness of dielectric layer) was 5 μm and a number of laminated dielectric layers were 4. Capacitance of the obtained samples were measured under a measured condition of frequency at 1 kHz and measured voltage at 1 Vrms with not impressing direct current or with impressing direct current at 20 V/μm. And a change rate of capacitance with not impressing direct current with respect to capacitance with impressing direct current was determined to DC-Bias characteristic. Namely, when DC-Bias characteristic is negative, capacitance decreases as direct current impresses. In the present example, DC-Bias characteristic closest to 0 is preferable, and within 15% were determined good. Results are shown in Table 1.

TABLE 1

| | $(Ba_{1-x}La_{2x/3})_y Nb_2O_{5+y}$ | | characteristics of a sintered body | | | |
|---|---|---|---|---|---|---|
| Samples | x | y | Contraction Ratio [%] | Specific Permittivity | Insulation Resistivity [Ω·m] | DC-Bias (20 V/μm) |
| $BaTiO_3$ | — | — | — | 1238 | — | −78% |
| 1 | 0.40 | 0.600 | 17.5 | 90 | 1.0E+05 | 0% |
| 2 | 0.40 | 0.700 | 17.4 | 101 | 2.4E+05 | −1% |
| 3 | 0.40 | 0.900 | 17.5 | 178 | 5.4E+05 | −1% |
| 4 | 0.40 | 0.950 | 17.5 | 310 | 3.0E+06 | −2% |
| 5 | 0.40 | 0.990 | 17.6 | 390 | 6.1E+07 | −2% |
| 6 | 0.40 | 0.995 | 17.6 | 405 | 7.0E+07 | −2% |
| 7 | 0.40 | 0.996 | 17.6 | 410 | 6.0E+07 | −2% |
| 8 | 0.40 | 0.998 | 17.7 | 429 | 5.1E+07 | −2% |
| 9 | 0.40 | 0.999 | 17.8 | 440 | 2.0E+05 | −2% |
| *10 | 0.40 | 1.000 | 17.8 | unmeasurable | <1.0E+04 | unmeasurable |
| *11 | 0.40 | 1.100 | 17.8 | unmeasurable | <1.0E+04 | unmeasurable |

"mE+n" indicates "m × 10$^n$"
Samples with "*" are reference examples of the invention.

In Table 1, samples 1 to 9 of y<1.000 were confirmed to show insulation resistivity of $1.0 \times 10^5$ or more. Namely, samples 1 to 9 showed resistance to reduction and were confirmed to be suitable for reduction firing. Further, DC-Bias characteristic of samples 1 to 9 were superior when compared to samples using $BaTiO_3$ as dielectric raw materials.

In particular, samples 2 to 9 of $0.700 \leq y < 1.000$ showed good insulation resistivity and specific permittivity of 100 or more.

On the other hand, samples 10 and 11 of $y \geq 1.000$ were unable to measure their specific permittivity and insulation resistivity; and their insulation resistivity was at least less than $1.0 \times 10^4$. Thus, their DC-Bias characteristic was also unable to measure. Further, conduction type of thermoelectric power of said samples were confirmed to be n-type semiconductor. Therefore, insulation resistivity of samples 10 and 11 decreased due to reduction firing, generating oxygen defect and free electron in dielectric ceramic composition and making said dielectric ceramic composition a n-type semiconductor.

Example 2

Samples of ceramic capacitor were manufactured in the same way as sample 8 of Example 1, except using a mixture of a powder of the compound used in example 1 and an oxide powder shown in Table 2 as dielectric raw materials. And then the same evaluation as example 1 was performed. Results are shown in Table 2.

Note that oxide powder content of each samples 20 to 24 was set to be 1.0 mole in terms of element with respect to 100 moles of a compound. Further, a total content of V oxide and Mn oxide in sample 25 was set to be 1.0 mole in terms of element with respect to 100 moles of the compound.

TABLE 2

| | $(Ba_{1-x}La_{2x/3})_y Nb_2O_{5+y}$ | | Oxide Kind | characteristics of a sintered body | | | |
|---|---|---|---|---|---|---|---|
| Samples | x | y | | Firing Temperature [° C.] | Contraction Ratio [%] | Specific Permittivity | Insulation Resistivity [Ω·m] |
| 8 | 0.40 | 0.998 | — | 1300 | 17.7 | 429 | 5.1E+07 |
| 20 | 0.40 | 0.998 | V | 1275 | 17.7 | 375 | 2.1E+11 |
| 21 | 0.40 | 0.998 | Fe | 1300 | 18.2 | 446 | 1.1E+10 |
| 22 | 0.40 | 0.998 | Mo | 1300 | 18.1 | 402 | 7.9E+09 |
| 23 | 0.40 | 0.998 | W | 1300 | 18.3 | 395 | 3.4E+08 |
| 24 | 0.40 | 0.998 | Mn | 1275 | 17.8 | 380 | 2.2E+10 |
| 25 | 0.40 | 0.998 | V, Mn | 1275 | 18.3 | 362 | 2.0E+12 |

"mE+n" indicates "m × 10$^n$"

Table 2 indicates that insulation resistivity further improves when dielectric ceramic composition includes oxides of V, Mo, Fe, W, Mn and Cr in addition to the above compounds. In particular, it was confirmed that insulation resistivity greatly improves when V and Mn oxides were simultaneously used. Further, by including V oxide, sufficient contraction ratio can be obtained at a low temperature, when compared to the sample (sample 8) of not including oxide.

Example 3

Samples of ceramic capacitor were manufactured in the same way as sample 20 of Example 2, except V oxide content is as shown in Table 3. Results are shown in Table 3. Note that "y" values of samples 26 to 28 are shown in table 3.

TABLE 3

| | (Ba$_{1-x}$La$_{2x/3}$)$_y$Nb$_2$O$_{5+y}$ | | Oxide | | Contraction Ratio | Specific Permittivity | characteristics of a sintered body Insulation Resistivity | DC-Bias |
|---|---|---|---|---|---|---|---|---|
| Samples | x | y | Kind | Content [mol] | [%] | | [Ω·m] | (20 V/μm) |
| 8 | 0.40 | 0.998 | — | — | 17.7 | 429 | 5.1E+07 | −2% |
| 20a | 0.40 | 0.998 | V | 0.01 | 17.7 | 425 | 1.2E+08 | −2% |
| 20b | 0.40 | 0.998 | V | 0.05 | 17.7 | 420 | 2.0E+10 | −2% |
| 20c | 0.40 | 0.998 | V | 0.5 | 17.7 | 390 | 8.0E+10 | −2% |
| 20 | 0.40 | 0.998 | V | 1.0 | 17.7 | 375 | 2.1E+11 | −2% |
| 20d | 0.40 | 0.998 | V | 2.5 | 18.1 | 352 | 3.5E+10 | −2% |
| 20e | 0.40 | 0.998 | V | 5.0 | 18.4 | 340 | 9.0E+08 | −2% |
| 20f | 0.40 | 0.998 | V | 7.0 | 18.5 | 290 | 1.5E+08 | −1% |
| 26 | 0.40 | 0.600 | V | 1.0 | 17.8 | 85 | 3.0E+05 | 0% |
| 27 | 0.40 | 0.950 | V | 1.0 | 17.7 | 305 | 8.0E+07 | −2% |
| 28 | 0.40 | 0.999 | V | 1.0 | 17.9 | 410 | 3.0E+05 | −2% |

"mE+n" indicates "m × 10$^m$"

From table 3, it was confirmed that V oxide content is preferably within a range of 0.05 to 5 mol %. Further, good values could be obtained even when "y" value changed. Note that content of Mo, Fe, W, Mn and Cr oxides are also preferably within a range of 0.05 to 5 mol %.

Example 4

Samples of ceramic capacitor were manufactured in the same way as sample 8 of Example 1, except "x" value in a general formula used in example 1 was as shown in Table 4. And then the same evaluation as example 2 was performed. Results are shown in Table 4.

TABLE 4

| | (Ba$_{1-x}$La$_{2x/3}$)$_y$Nb$_2$O$_{5+y}$ | | Contraction Ratio | Specific Permittivity | characteristics of a sintered body Insulation Resistivity |
|---|---|---|---|---|---|
| Samples | x | y | [%] | | [Ω·m] |
| 30 | 0.20 | 0.998 | 15.5 | 201 | 7.2E+07 |
| 31 | 0.23 | 0.998 | 16.0 | 299 | 6.9E+07 |
| 32 | 0.25 | 0.998 | 16.1 | 319 | 6.6E+07 |
| 33 | 0.30 | 0.998 | 16.6 | 335 | 6.1E+07 |
| 34 | 0.33 | 0.998 | 17.0 | 441 | 5.8E+07 |
| 35 | 0.35 | 0.998 | 17.2 | 444 | 5.6E+07 |
| 8 | 0.40 | 0.998 | 17.7 | 429 | 5.1E+07 |
| 36 | 0.43 | 0.998 | 18.0 | 426 | 5.0E+07 |
| 37 | 0.45 | 0.998 | 18.2 | 330 | 4.7E+07 |
| 38 | 0.48 | 0.998 | 18.6 | 291 | 4.4E+07 |
| 39 | 0.50 | 0.998 | 18.8 | 219 | 4.3E+07 |

"mE+n" indicates "m × 10$^m$"

Table 4 shows that contraction ratio increases, namely, density of a sintered body increases when "x" is large.

Further, good insulation resistivity as well as a relatively high specific permittivity can be obtained when "x" is larger than 0.2 and less than 0.5. By setting "x" within a range of 0.33 to 0.43, 400 or more of dielectric constant and 5.0×10$^7$ [Ω·m] or more of insulation resistivity can be obtained; and effects of the invention can be further improved.

In the present example, although a single layered capacitor was mainly evaluated, a multilayer ceramic capacitor wherein dielectric layers and internal electrodes are laminated shows the same characteristics as shown by the capacitor samples of the present examples. As mentioned above, multilayer ceramic capacitor is obtained by firing green chip formed by using paste.

The invention claimed is:

1. A dielectric ceramic composition comprising a compound shown by a general formula {A$_{1-x}$(RE)$_{2x/3}$}$_y$-B$_2$O$_{5+y}$ having tungsten bronze-type structure,
   wherein "A" is at least one selected from Ba, Ca, Sr and Mg, "B" is at least one selected from Nb and Ta, "RE" is at least one selected from Sc, Y, La, Ce, Pr, Nd, Sm, Eu, Gd, Tb, Dy, Ho, Er, Tm, Yb and Lu, and "x" and "y" satisfies 0<x<1 and 0.700<y<1.000, respectively.

2. The dielectric ceramic composition as set forth in claim 1 further comprising an oxide of at least one selected from V, Mo, Fe, W, Mn and Cr.

3. An electronic device comprising a dielectric layer constituting dielectric ceramic composition as set forth in claim 1 and an internal electrode mainly composed of a base metal.

4. An electronic device comprising a dielectric layer constituting dielectric ceramic composition as set forth in claim 2 and an internal electrode mainly composed of a base metal.

* * * * *